K. C. RANDALL,
ELECTRICAL PROTECTIVE DEVICE.
APPLICATION FILED DEC. 2, 1915.
1,204,486.
Patented Nov. 14, 1916.
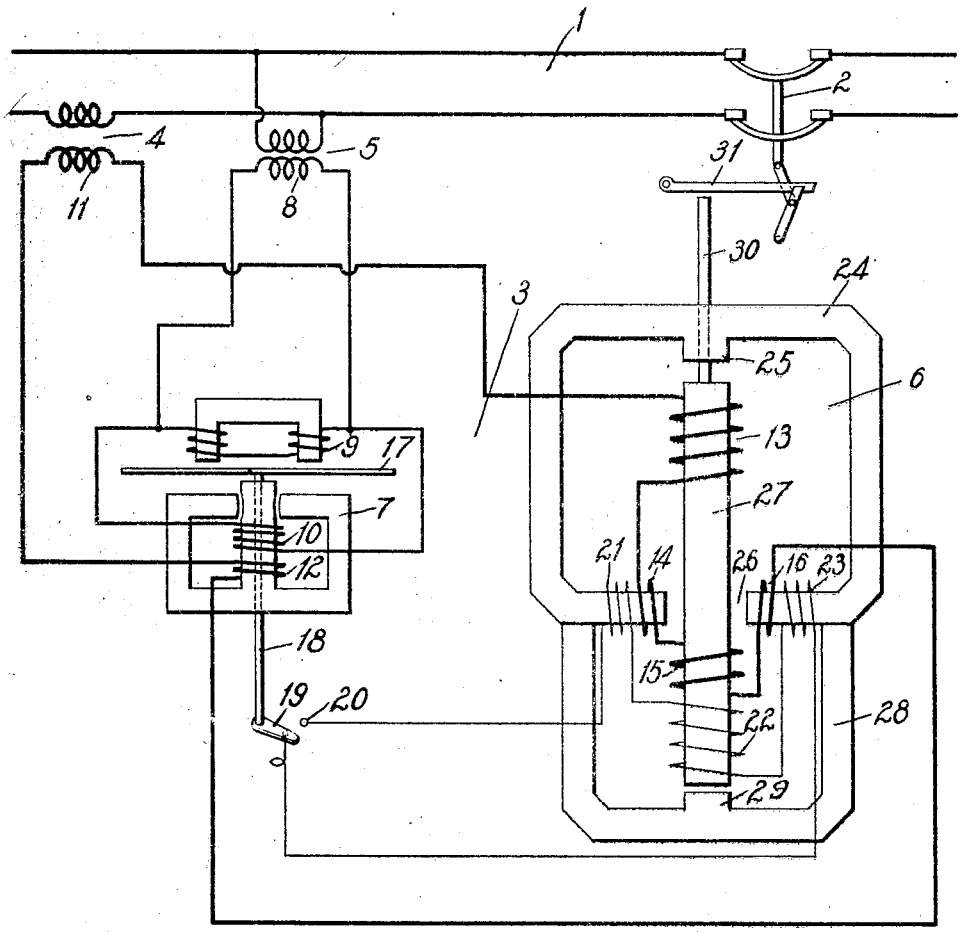
WITNESSES:
INVENTOR
Karl C. Randall.
BY
ATTORNEY

UNITED STATES PATENT OFFICE.

KARL C. RANDALL, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,204,486.   Specification of Letters Patent.   Patented Nov. 14, 1916.

Application filed December 2, 1915. Serial No. 64,697.

*To all whom it may concern:*

Be it known that I, KARL C. RANDALL, a citizen of the United States, and a resident of Edgewood Park, in the county of Allegheny and State of Pennsylvania, have invented a new and useful Improvement in Electrical Protective Devices, of which the following is a specification.

My invention relates to electrical-protective devices and particularly to trip-coil mechanisms that are employed to trip circuit interrupters or other similar devices, upon the occurrence of predetermined circuit conditions.

My invention has for its object to provide a device of the above indicated character that shall operate correctly upon any value of overload.

Copending application Serial No. 850,331, filed by B. H. Smith July 11, 1914, and assigned to the Westinghouse Electric and Manufacturing Company, discloses a relay system that comprises a time-element relay which controls an auxiliary winding on the tripping electromagnet for the purpose of permitting the electromagnet to operate under predetermined conditions. With a device of this type, a circuit interrupter may be tripped by current derived from a circuit in connection with which the circuit interrupter is employed without subjecting the contact members of the relay to any injurious arcing or welding. However, when a device of this type is employed to interrupt very large currents, the tripping electromagnet may frequently operate, irrespective of the operation of the relay. That is, the flux in the magnetic circuit of the electromagnet divides improperly to cause the armature to be actuated.

In order to cause the tripping electromagnet to operate correctly at any value of current, I provide a plurality of secondary holding windings that are so disposed with respect to the stationary magnetizable core member of the electromagnet that the flux therein is precluded from dividing until such times as the neutralizing or auxiliary windings are closed-circuited by the operation of the relay. By the use of the secondary-holding winding and secondary neutralizing or auxiliary windings, the selective features are accentuated. Thus, when a relatively large overload traverses the circuit, the tripping of the circuit interrupter will be delayed until after the operation of the relay.

The single figure of the accompanying drawings is a diagrammatic view of a distributing system embodying my invention.

An alternating-current circuit 1 is provided with an interrupter 2 that is controlled in its operation by a relay system 3 which derives its energy from the circuit 1 through a current transformer 4 and a voltage transformer 5. The relay system 3 comprises a tripping electromagnet 6 and a relay 7 that is of the induction type and may be constructed as set forth in U. S. application Serial No. 497,799, filed May 22, 1909, by Frank Conrad, and assigned to the Westinghouse Electric and Manufacturing Company. The secondary winding 8 of the transformer 5 is connected to the windings 9 and 10 of the relay 7, and the secondary winding 11 of the transformer 4 is connected in series relation to the winding 12 of the relay 7 and the windings 13, 14, 15 and 16 of the electromagnet 6. The relay 7 is provided with an armature 17 that is mounted on a shaft 18 which is provided with a contact arm 19. The contact arm 19 coöperates with a stationary contact member 20 for the purpose of controlling the circuit of auxiliary controlling or neutralizing windings 21, 22 and 23 of the electromagnet 6.

The electromagnet 6 comprises a stationary core member 24 in the form of a hollow rectangle having a pole piece 25 extending inwardly and downwardly from the upper cross-piece thereof and having a gap 26 in the lower cross-piece through which projects a movable core member 27 that is adapted for longitudinal, vertical movement. A substantially E-shaped magnetizable core member 28 is mounted with its longer legs terminating adjacent the lower end of the core member 24. The movable core member 27 normally rests upon the middle leg or pole-piece 29 of the core member 28, and, together with the pole-piece 29, is surrounded by the windings 15 and 22. The movable core member 27 is provided with an operating rod 30 that is adapted to trip the latch 31 of the circuit interrupter 2, under predetermined conditions. The windings 14, 16, 21 and 23 are disposed around the lower end cross-piece of the core member 24, for reasons hereinafter more fully set forth.

As hereinbefore stated, the windings 13, 14, 15 and 16 are supplied with current from the secondary winding 11 of the transformer 4 and are preferably connected in series with the winding 12 of the relay 7, although they may be connected in any other suitable relation with respect thereto. The windings 21, 22 and 23 are normally open-circuited and are adapted to be closed-circuited with the engagement of the contact members 19 and 20 of the relay 7, under predetermined conditions, such, for instance, as upon the occurrence of an overload or a reversal of the flow of energy in the circuit 1.

Under normal circuit conditions, the current in the winding 12 of the relay 7 is insufficient to cause the switch 19—20 to close, and, consequently, the windings 21, 22 and 23 remain open-circuited and are not affected. However, the windings 13, 14, 15 and 16 are continuously energized so long as the circuit interrupter 2 remains closed, but, since the windings 13 and 15 are located upon opposite sides of the lower end cross-piece of the core member 24, and, since the windings 14 and 16 are disposed around the lower end cross-piece thereof and are so wound that the flux in the magnetic circuits is precluded from dividing, the movable core member 27 is biased in its lowermost position. That is, the flux set up by the windings 13 and 15 coöperates with the flux set up by the windings 14 and 16 to hold the core member 27 in its lowermost position, because the windings 14 and 16 prevent the flux from traversing the lower end cross-piece. Thus, the windings 14 and 16 accentuate the action of the device by precluding a division of the flux therein.

When a normal overload occurs upon the circuit 1, an increased current is induced in the winding 11 of the transformer 4 that is sufficient to cause the relay to close the switch 19—20. The closing of the switch may be delayed or not, as desired. When the switch 19—20 is closed, the windings 21, 22 and 23 are closed-circuited and electromotive forces are induced therein by the windings 14, 15 and 16, thereby decreasing the magnetizing effects of the windings 14, 15 and 16 because of the counterflux produced by the windings 21, 22 and 23. When the magnetizing effects of the windings 14, 15 and 16 are reduced, the pull exerted by the winding 13 predominates over that of the windings 14, 15 and 16, because the flux is permitted to so divide that a relatively greater portion thereof traverses the lower end cross-piece. Thus, the movable core member 27 will rise in its entirety to trip the circuit interrupter 2. If an abnormal or an excessive overload occurs on the circuit 1, the force opposing the upward movement of the movable core member 27 is accentuated by the windings 14 and 16, to thus preclude the actuation of the electromagnet 6 until the relay 7 has operated to close the switch 19—20.

I do not limit my invention to the particular device illustrated, as it may be variously modified within the scope of the appended claims.

I claim as my invention:

1. An electromagnet comprising an armature, a stationary core member having lateral projections that extend inwardly adjacent to an intermediate portion of the armature, an actuating winding disposed around the armature, a holding winding disposed around the armature, two holding windings disposed around the lateral projections, said actuating and holding windings being series connected and the holding windings being adapted to normally oppose the operation of the armature, and neutralizing windings for the said holding windings.

2. An electromagnet comprising a movable core member, a stationary core member having lateral projections that extend inwardly adjacent to the said movable core member, an actuating winding disposed around the movable core member, holding windings connected in series with the actuating winding and surrounding the movable core member and the lateral projections, and series-connected neutralizing windings surrounding the projections and the movable core member on one side of the projections.

3. An electromagnet comprising an armature, a yoke surrounding the armature and having lateral projections that extend inwardly adjacent to an intermediate portion of the armature, normally energized windings surrounding the projections and the armature upon both sides of the projections, and normally open-circuited windings that surround the projections and the armature upon only one side of the projections.

4. An electromagnet comprising a main magnetizable core member of substantially the form of a hollow rectangle having an opening in one of the sides thereof, an armature extending through the said opening, an auxiliary core member having legs terminating adjacent to the aforesaid core member upon opposite sides of the opening therein, normally energized windings for opposite ends of the armature and for the side of the main core member having the opening therein and normally open-circuited windings for one portion of the armature and for the side of the main core member having the opening therein.

5. An electromagnet comprising a stationary magnetizable core member having lateral inwardly-extending projections thereon, a movable core member, an actuating winding disposed around the movable core member, holding windings disposed around the projections and in series with the actuating winding and series-connected secondary windings disposed around the movable core member and the said projections.

6. An electromagnet comprising a magnetizable core having a divided magnetic circuit, an armature subject to the influence of both circuits but normally biased in a given position, a main winding for tending to move the armature out of its biased position, holding windings connected in series with the main winding for maintaining the biased position by precluding the division of the flux in the magnetic circuit, and series-connected auxiliary windings for assisting the division of the flux in the magnetic circuit to permit the main winding to move the armature out of its biased position under predetermined conditions.

7. An electromagnet comprising an armature, a yoke surounding the armature and having lateral projections that extend inwardly adjacent to an intermediate portion of the armature, normally energized windings surrounding the projections and the armature on both sides of the projections and adapted to hold the armature in a predetermined position, and normally open-circuited windings that surround the projections and the armature upon only one side of the projections and adapted to permit the armature to be actuated when they are short-circuited.

8. An electromagnet comprising a stationary magnetizable core member having lateral inwardly-extending projections thereon, a movable core member, an actuating winding disposed around the movable core member, holding windings connected in series with the actuating winding and disposed around the projections, and normally open-circuited windings disposed around the said projections for neutralizing the said holding windings under predetermined conditions.

9. The combination with an electric circuit and a relay having an operating winding, of an electromagnet comprising a stationary magnetizable core member having lateral inwardly-extending projections thereon, a movable core member, an actuating winding disposed around the movable core member and connected in series with the relay winding and in operative relation to the circuit, holding windings disposed around the projections and in series with the actuating winding, and normally open-circuited secondary windings disposed around the said projections and adapted to be close-circuited by the relay under predetermined conditions.

10. The combination with an electric circuit and a relay having an operating winding, of an electromagnet comprising an armature, a yoke surrounding the armature and having lateral projections that extend inwardly adjacent to an intermediate portion of the armature, normally energized windings surrounding the projection and the armature on both sides of the projections and connected in series with the relay winding, and normally open-circuited windings that surround the projections and the armature upon only one side of the projections and adapted to be close-circuited by the relay.

11. An electromagnet comprising a movable core member, a stationary core member having lateral projections that extend inwardly adjacent to the said movable core member, an actuating winding disposed around the movable core member, holding windings connected in series with the actuating winding and surrounding the movable core member and the lateral projections, and normally open-circuited windings surrounding the projections and the movable core member on one side of the projections.

In testimony whereof, I have hereunto subscribed my name this 26th day of Nov. 1915.

KARL C. RANDALL.